United States Patent
Xu et al.

(10) Patent No.: US 10,093,821 B2
(45) Date of Patent: Oct. 9, 2018

(54) AQUEOUS COATING COMPOSITION AND PROCESS OF MAKING THE SAME

(71) Applicants: Rohm and Haas Company, Philadelphia, PA (US); Dow Global Technologies LLC, Midland, MI (US)

(72) Inventors: Jianming Xu, Shanghai (CN); Yawei Xu, Shanghai (CN); Baoqing Zheng, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/029,640

(22) PCT Filed: Oct. 22, 2013

(86) PCT No.: PCT/CN2013/085640
§ 371 (c)(1),
(2) Date: Apr. 15, 2016

(87) PCT Pub. No.: WO2015/058344
PCT Pub. Date: Apr. 30, 2015

(65) Prior Publication Data
US 2016/0244629 A1    Aug. 25, 2016

(51) Int. Cl.
| | | |
|---|---|---|
| *C09D 133/12* | (2006.01) | |
| *C09D 5/02* | (2006.01) | |
| *C08F 220/20* | (2006.01) | |
| *C09D 133/14* | (2006.01) | |
| *C09D 125/14* | (2006.01) | |
| *C09D 133/08* | (2006.01) | |
| *C09D 7/40* | (2018.01) | |
| *C08K 3/36* | (2006.01) | |

(52) U.S. Cl.
CPC .......... *C09D 133/12* (2013.01); *C08F 220/20* (2013.01); *C09D 5/02* (2013.01); *C09D 7/40* (2018.01); *C09D 125/14* (2013.01); *C09D 133/08* (2013.01); *C09D 133/14* (2013.01); *C08K 3/36* (2013.01)

(58) Field of Classification Search
CPC .. C09D 133/08; C09D 133/12; C09D 133/14; C09D 5/02; C09D 125/14; C09D 7/12; C08K 3/36; C08F 220/20

USPC .......................................................... 524/493
See application file for complete search history.

(56) References Cited

U.S. PATENT DOCUMENTS

| | | | |
|---|---|---|---|
| 5,368,833 A | 11/1994 | Johansson et al. | |
| 7,683,123 B2 * | 3/2010 | Onoue | C09D 7/68 524/800 |
| 2007/0106008 A1 * | 5/2007 | Onoue | C09D 7/68 524/493 |
| 2012/0041112 A1 | 2/2012 | Lohmewer et al. | |

FOREIGN PATENT DOCUMENTS

| | | | |
|---|---|---|---|
| CN | 1544558 A | * | 11/2004 |
| CN | 1898345 A | * | 1/2007 |
| CN | 102399483 A | | 4/2012 |
| JP | H10168380 A | | 6/1998 |
| JP | 11106681A A | | 4/1999 |
| JP | 11256076 A | | 9/1999 |
| JP | 3624274 B2 | * | 3/2005 |
| JP | 3624274 B2 | * | 3/2005 |
| WO | 2000061691 A1 | | 10/2000 |
| WO | 2003066747 A1 | | 8/2003 |
| WO | 2012130763 A1 | | 10/2012 |
| WO | 2013073769 A1 | | 5/2013 |

OTHER PUBLICATIONS

Iler, K. Ralph; The Chemistry of Silica; John Wiley & Sons (1979); pp. 407-409.
Planken, K. L.; Analytical Chemistry (2008), vol. 80, No. 23, pp. 8871-8879.
International Search Report for International Application No. PCT/CN2013/035640; International Filing Date Oct. 22, 2013; dated Jun. 25, 2014; 3 pages.
Written Opinion of the International Search Report for International Application No. PCT/CN2013/085640; International Filing Date Oct. 22, 2013; dated Jun. 25, 2014; 5 pages.

* cited by examiner

*Primary Examiner* — Michael Bernshteyn
(74) *Attorney, Agent, or Firm* — Karl E. Stauss; Cantor Colburn LLP

(57) ABSTRACT

An aqueous coating composition capable of providing coating films with balanced properties of high hardness, high clarity, good water resistance, and good alcohol resistance; and a process of making such aqueous coating composition.

14 Claims, No Drawings

AQUEOUS COATING COMPOSITION AND PROCESS OF MAKING THE SAME

FIELD OF THE INVENTION

The present invention relates to an aqueous coating composition and a process of making such aqueous coating composition.

INTRODUCTION

It is desirable for coating compositions to have a low content of volatile organic components (VOC), for example, less than 150 grams of VOC per liter of coating composition according to the GB 18582 method. Aqueous polymer binders with low glass transition temperature ($T_g$), for example, $T_g$ of 45° C. or less, are widely used in coating compositions having a low VOC content. However, such coating compositions usually provide coating films with undesirably low hardness. For example, a pencil hardness of B according to the ASTM D3363 method, usually results in less satisfactory block resistance and/or scratch resistance. In contrast, polymer binders with higher $T_g$ may provide coating films with higher hardness, but higher dosage of coalescents needed to facilitate film formation usually results in higher VOC content. Therefore, it is a challenge to increase the hardness of coating films without increasing the VOC content of coating compositions.

Attempts have been made to add colloidal silica into low $T_g$ polymer binder dispersions to increase the hardness of the resultant coating films, while maintaining the dosage of coalescents in coating compositions. These colloidal silica-containing coating compositions, however, usually provide coating films with unsatisfactory water resistance and alcohol resistance, and undesirably low clarity. Aqueous coating compositions in many applications such as in wood coatings are required to have sufficient water resistance and 48% alcohol resistance, for example, a water resistance level of at least 3 and a 48% alcohol resistance level of at least 3 according to the BS: EN12720:2009 method. For wood coatings, coating films desirably will have a clarity value of at least 20% or higher.

Therefore, it is desirable to provide a coating composition with a low VOC content that provides coating films with balanced properties of high hardness, high clarity, good water resistance, and good alcohol resistance.

SUMMARY OF THE INVENTION

The present invention provides a novel aqueous coating composition with a low VOC content that provides coating films with balanced properties of high hardness, high clarity, good water resistance, and good alcohol resistance. The aqueous coating composition of the present invention comprises an aqueous emulsion polymer, colloidal silica and an alkyl silane, and has a VOC content of less than 150 grams per liter of the coating composition according to the GB 18582 method. The coating film made from such aqueous coating composition has a pencil hardness of HB or harder according to ASTM D3363 method, a clarity value of at least 20%, and a water-resistance level of at least 3 and a 48% alcohol-resistance level of at least 3 according to BS: EN12720:2009 method.

In a first aspect, the present invention is an aqueous coating composition, comprising, (a) an aqueous emulsion polymer present in an amount of from 50 to 88% by weight based on total solids weight of the coating composition;

(b) colloidal silica present in an amount of from 14 to 80%, by solids weight, based on the weight of the emulsion polymer;

(c) an alkyl silane of Formula (I):

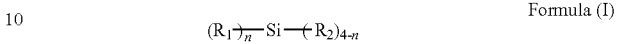

Formula (I)

wherein $R_1$ is a saturated alkyl group with more than 4 carbon atoms; $R_2$ is an alkoxy group with 1 to 3 carbon atoms, and n is an integer from 1 to 3; wherein the weight ratio of the alkyl silane to solids weight of the colloidal silica is from 0.11 to 0.23; and (d) water;

wherein the content of volatile organic components in the coating composition is less than 150 g/L.

In a second aspect, the present invention is an aqueous coating composition comprising, (a) from 60 to 86.4% by weight, based on total solids weight of the coating composition, an acrylic emulsion copolymer comprising, as copolymerized units, at least one ethylenically unsaturated nonionic monomer and at least one ethylenically unsaturated monomer having a functional group selected from carbonyl, acetoacetate, alkoxysilane, carboxyl, ureido, amide, imide, amino group, or mixtures thereof;

(b) from 17 to 42% by solids weight of colloidal silica, based on the weight of the emulsion polymer;

(c) an alkyl silane of Formula (I):

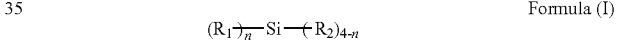

Formula (I)

wherein $R_1$ is a saturated alkyl group with 6 to 16 carbon atoms; $R_2$ is an alkoxy group with 1 to 3 carbon atoms, and n is an integer from 1 to 3; wherein the weight ratio of the alkyl silane to solids weight of the colloidal silica is from 0.15 to 0.2;

(d) water;

(e) from 0.5 to 4.5% by weight of a coalescent, based on total solids weight of the coating composition;

(f) from 0 to 4% by weight of a matting agent, based on total solids weight of the coating composition; and (g) from 0 to 1% by weight of a crosslinking agent, based on total solids weight of the coating composition;

wherein the content of volatile organic components in the coating composition is less than 150 g/L.

In a third aspect, the present invention is a process of preparing the aqueous coating composition of the first or second aspect. The process comprises admixing:

(a) an aqueous emulsion polymer present in an amount of from 50 to 88% by weight based on total solids weight of the coating composition;

(b) colloidal silica present in an amount of from 14 to 80%, by solids weight, based on the weight of the emulsion polymer;

(c) an alkyl silane of Formula (I):

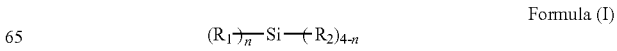

Formula (I)

wherein $R_1$ is a saturated alkyl group with more than 4 carbon atoms; $R_2$ is an alkoxy group with 1 to 3 carbon atoms, and n is an integer from 1 to 3; wherein the weight ratio of the alkyl silane to solids weight of the colloidal silica is from 0.11 to 0.23; and (d) water;

wherein the content of volatile organic components in the coating composition is less than 150 g/L.

DETAILED DESCRIPTION OF THE INVENTION

The aqueous coating composition of the present invention comprises one or more aqueous emulsion polymers. The emulsion polymers may comprise one or more acrylic (co)polymers. "Acrylic" in the present invention includes (meth)acrylic acid, (meth)alkyl acrylate, (meth)acrylamide, (meth)acrylonitrile and their modified forms such as (meth) hydroxyalkyl acrylate.

The emulsion polymer useful in the present invention may comprise, as copolymerized units, one or more ethylenically unsaturated nonionic monomers. "Nonionic monomers" herein refer to monomers that do not bear an ionic charge between pH=1-14. Examples of suitable ethylenically unsaturated nonionic monomers include (meth)acrylic ester monomers such as methyl acrylate, ethyl acrylate, butyl acrylate, 2-ethylhexyl acrylate, nonyl acrylate, decyl acrylate, lauryl acrylate, hydroxyethyl acrylate, hydroxypropyl acrylate, methyl methacrylate, ethyl methacrylate, butyl methacrylate, nonyl methacrylate, isodecyl methacrylate, lauryl methacrylate, hydroxyethyl methacrylate, and hydroxypropyl methacrylate; (meth)acrylonitrile; styrene and substituted styrene; butadiene; ethylene, propylene, and 1-decene; vinyl acetate, vinyl butyrate, vinyl versatate and other vinyl esters; vinyl monomers such as vinyl chloride and vinylidene chloride; or mixtures thereof. The ethylenically unsaturated nonionic monomers preferably comprise from 90 to 98% by weight of (meth)acrylic ester monomers, based on the weight of total monomers.

The emulsion polymer useful in the present invention may comprise, as copolymerized units, one or more ethylenically unsaturated anionic monomers. "Ethylenically unsaturated anionic monomers" include, for example, polymerizable acids, anhydrides, and the metal ion (for example, Li, Na, K, Ca) and ammonium ion salts thereof. Examples of suitable polymerizable ethylenically unsaturated anionic monomers include acrylic acid, methacrylic acid, itaconic acid, phosphoethyl methacrylate, vinyl phosphonic acid, allyl phosphonic acid, fumaric acid, maleic acid, monomethyl itaconate, monomethyl fumarate, monobutyl fumarate, maleic anhydride, 2-acrylamido-2-methyl-1-propanesulfonic acid, sodium salt of 2-acrylamido-2-methyl-1-propanesulfonic acid, ammonium salt of 2-acrylamido-2-methyl-1-propane sulfonic acid, sodium vinyl sulfonate, sodium salt of allyl ether sulfonate, and the like, and mixtures thereof.

The emulsion polymer useful in the present invention may comprise, based on the weight of the emulsion polymer, 0.1% by weight or more of the copolymerized ethylenically unsaturated anionic monomer, 0.5% by weight or more, or even 1% by weight or more, and at the same time, 20% by weight or less, 10% by weight or less, or even 5% by weight or less.

The emulsion polymer useful in the present invention may further comprise, as copolymerized units, one or more ethylenically unsaturated monomers having one or more functional groups. The functional groups may be selected from carbonyl, acetoacetate, alkoxysilane, ureido, amide, imide, amino group, or mixtures thereof. Preferably, an ethylenically unsaturated monomer bearing a carbonyl group such as diacetone acrylamide is used.

The emulsion polymer useful in the present invention may comprise, based on the weight of the emulsion polymer, 0.1% by weight or more of the copolymerized functional-group-containing ethylenically unsaturated monomer may be, 0.5% by weight or more, or even 1% by weight or more, and at the same time, 20% by weight or less, 10% by weight or less, or even 5% by weight or less.

The polymerization techniques used to prepare the emulsion copolymer are well known in the art, for example, an emulsion polymerization. In the emulsion polymerization process, conventional surfactants may be used. These conventional surfactants may include anionic and/or nonionic emulsifiers, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. Preferred surfactants are reactive surfactants. Suitable commercially available surfactants include, for example, TREM™ LF-40 surfactant based on sodium alkyl allyl sulfosuccinate available from Cognis, ADEKA™ Resoap SR-10 reactive anionic emulsifier available from Adeka, DEXTROL™ OC-1525 surfactant based on ammonium phosphate ester nonyl phenol ethoxylate available from Dexter, LATEMUL™ PD-104 anionic polymerizable surfactant available from Kao Chemicals, HITENOL™ KH-10 anionic polymerizable surfactant available from Dai-ichi Kogyo Seiyaku Co. Ltd, or mixtures thereof. The amount of surfactant used is usually 0.1 to 6% by weight, based on the total weight of monomers.

In the emulsion polymerization process, conventional free radical initiators may be used. Examples of suitable free radical initiators include hydrogen peroxide, sodium peroxide, potassium peroxide, t-butyl hydroperoxide, cumene hydroperoxide, ammonium and/or alkali metal persulfates, sodium perborate, perphosphoric acid, and salts thereof, potassium permanganate, and ammonium or alkali metal salts of peroxydisulfuric acid. The free radical initiators may be used typically at a level of 0.01 to 3.0% by weight, based on the total weight of monomers.

In the emulsion polymerization process, redox systems comprising the initiators described above, a suitable reductant, and a metal salt catalyst may be used in the process. Examples of suitable reductants include sodium sulfoxylate formaldehyde, ascorbic acid, isoascorbic acid, alkali metal and ammonium salts of sulfur-containing acids, for example, sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid, and salts of the preceding acids. Redox reaction catalyzing metal salts of iron, copper, manganese, silver, platinum, vanadium, nickel, chromium, palladium, or cobalt may be used. Chelating agents for the metals may also be used.

In the emulsion polymerization process, one or more chain transfer agents may also be used. Examples of suitable chain transfer agents include 3-mercaptopropionic acid, dodecyl mercaptan, methyl 3-mercaptopropionate, benzenethiol, azelaic alkyl mercaptan, or mixtures thereof. When present, the concentration of the chain transfer agent may be, based on the total weight of monomers, from 0.01 to 5% by weight, from 0.05 to 2% by weight, or from 0.1 to 0.5% by weight.

In the emulsion polymerization process, organic bases and/or inorganic bases as neutralizers may also be used. Suitable bases include ammonia, sodium hydroxide, potassium hydroxide, zinc oxide, mono-ethanolamine, triethyl amine, diethyl amine, dimethyl amine, sodium borate, potassium borate, aluminum hydroxide and the composition thereof.

The emulsion polymer useful in the present invention may be in the form of an aqueous dispersion. The dispersion may contain solids present from 30 to 70% by weight, from 35 to 60% by weight, or from 40 to 50% by weight, based on the total weight of the aqueous dispersion.

The emulsion polymer useful in the present invention may have a $T_g$ of −20° C. or more, 0° C. or more, or even 10° C. or more, and at the same time, 45° C. or less, 40° C. or less, or even 30° C. or less. The value of $T_g$ herein is calculated according to the Fox Equation (T. G. Fox, Bull. Am. Phys. Soc. 1 (1956) 123).

Suitable commercially available acrylic copolymer emulsions include, for example, PRIMAL™ AC-261, ROSHIELD™ 3311, ROSHIELD EP-6060 and MAINCOTE™ 1100A acrylic emulsions all available from The Dow Chemical Company (PRIMAL, ROSHIELD and MAINCOTE are trademarks of The Dow Chemical Company); or mixtures thereof.

The emulsion polymer in the coating composition of the present invention may be present, by weight based on the total solids weight of the coating composition, in an amount of 50% or more, or even 55% or more, and at the same time, 88% or less, or even 85% or less. When a dispersion of the emulsion polymer is used, weight percentage of the emulsion polymer refers to the solids weight of the dispersion based on the total solids weight of the coating composition.

The aqueous coating composition of the present invention may further comprise colloidal silica. The colloidal silica herein refers to a dispersion of silica particles, which are typically dispersed in water, suitably in the presence of stabilizing cations such as $K^+$, $Na^+$, $Li^+$, $NH_4^+$, organic cations, primary, secondary, tertiary, and quaternary amines, and mixtures thereof. Preferably, the colloidal silica particles are negatively charged.

Colloidal silica may be derived from, for example, precipitated silica, fumed silica, pyrogenic silica or silica gels, and mixtures thereof.

Silica particles in the colloidal silica may be modified and can contain other elements such as amines, aluminium and/or boron. Boron-modified colloidal silica particles may include those described in, for example, U.S. Pat. No. 2,630,410. Aluminium-modified colloidal silica may have an aluminum oxide ($Al_2O_3$) content of from about 0.05 to about 3% by weight, and preferably from 0.1 to 2% by weight, based on total solids weight of the colloidal silica. The procedure of preparing the aluminium-modified colloidal silica is further described in, for example, "The Chemistry of Silica", by Iler, K. Ralph, pages 407-409, John Wiley & Sons (1979) and in U.S. Pat. No. 5,368,833.

Silica content of the colloidal silica may be present, based on the weight of colloidal silica, from 20 to 80% by weight, from 25 to 70% by weight, or from 30 to 60% by weight. The higher the silica content, the more concentrated the resulting colloidal silica dispersion will become. The pH value of the colloidal silica may be from about 1 to 13, from about 6 to 12, or from about 7.5 to 11. For aluminium-modified colloidal silica, the pH value is desirably from about 1 to 12, or from about 3.5 to 11.

The colloidal silica useful in the present invention may have an average particle diameter ranging from about 2 to about 100 nanometers (nm), from about 5 to 70 nm, from about 8 to about 50 nm, or from about 10 to about 40 nm, according to the test method described in the Examples section.

The colloidal silica in the aqueous coating composition may be present, by solids weight based on the solids weight of the emulsion polymer dispersion, in an amount of 14% or more, or even 20% or more, and at the same time, 80% or less, or even 70% or less.

The aqueous coating composition of the present invention further comprises one or more alkyl silanes. The alkyl silanes useful in the present invention may have the structure of Formula (I):

Formula (I)

wherein $R_1$ is a saturated alkyl group with more than 4 carbon atoms; $R_2$ is an alkoxy group with 1 to 3 carbon atoms, and n is an integer from 1 to 3.

Preferably, $R_1$ is a saturated alkyl group with 6 or more carbon atoms, or even 8 or more carbon atoms, and at the same time, 32 or less carbon atoms, 24 or less, or even 16 or less carbon atoms. If $R_1$ is a saturated alkyl group with 4 or less carbon atoms, an aqueous coating composition comprising such alkyl silane shows poor storage stability or even tends to gel when storage at room temperature (22 to 25° C.).

Examples of suitable alkyl silanes are octyl triethoxylsilane ("OCTEO"), octyl trimethoxylsilane ("OCTMO"), hexadecyl trimethoxy silane ("HDTMS"), hexadecyl triethoxyl silane, or mixtures thereof. Suitable commercially available alkyl silanes include, for example, SILQUEST™ HDTMS available from Momentive Performance Materials Inc; DYNASYLAN™ OCTMO, DYNASYLAN OCTEO, and DYNASYLAN 9116 functional silanes all available from Evonik Industries; or mixtures thereof. Alkyl silanes useful in the present invention are preferably in the form of an aqueous dispersion, for example, SILBLOCK™ WMS alkyl silane aqueous dispersion available from Momentive Performance Materials Inc.

The weight ratio of the alkyl silane to the solids weight of the colloidal silica is directly related to water resistance and alcohol resistance properties of the resultant coating film. The weight ratio of the alkyl silane to the solids weight of the colloidal silica may be 0.11 or more, or even 0.125 or more, and at the same time, 0.23 or less, or even 0.2 or less.

The aqueous coating composition of the present invention may further comprise one or more coalescents. "Coalescents" herein refer to slow-evaporating or non-evaporating solvents that fuse particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, or mixtures thereof. Suitable commercially available coalescents include, for example, DOWANOL™ Eph ethylene glycol phenyl ether, Butyl CELLOSOLVE™ ethylene glycol monobutyl ether, and DOWANOL DPnB dipropylene glycol n-butyl ether all available from The Dow Chemical Company (DOWANOL and CELLOSOLVE are trademarks of The Dow Chemical Company), or mixtures thereof.

The concentration of the coalescent in the aqueous coating composition may be, based on the total solids weight of the coating composition, 0.5% by weight or more, 1% by weight or more, and at the same time, 4.5% by weight or less, or even 4% by weight or less.

The aqueous coating composition of the present invention may also comprise one or more matting agents. "Matting agents" herein refer to any inorganic or organic particles that provide matt effect. The matting agent useful in the present invention may be a silica, polyurea, polyacrylate, polyethylene, or polytetrafluoroethene matting agent; or mixtures thereof. The matting agent may be in the form of powders or an emulsion. Preferably, matting agent powders are used. Suitable commercially available matting agents include, for example, ACEMATT™ TS-100 and ACEMATT OK520 silica matting agents both available from Evonik, DEUTERON™ MK polyurea matting agent available from Deuteron, SYLOID™ Silica 7000 matting agent available from Grace Davison, PARALOID™ PRD 137B polyacrylate emulsion available from The Dow Chemical Company (PARALOID is a trademark of The Dow Chemical Company); ULTRALUBE™ D277 HDPE/plastic emulsion, ULTRALUBE D818 montan/PE/plastic emulsion and ULTRALUBE D860 PE/ester emulsion all available from Keim-Additec; or mixtures thereof.

When present, the concentration of the matting agent may be, based on the total solids weight of the coating composition, 0.2% by weight or more, or even 0.5% by weight or more, and at the same time, 4% by weight or less, 3.5% by weight or less, or even 3% by weight or less. When a matting agent emulsion is used, weight percentage of the matting agent refers to the dry weight of the matting agent emulsion based on the total solids weight of the coating composition.

The aqueous coating composition of the present invention may further comprise one or more wax dispersions. The wax dispersions may comprise polyethylene (PE) wax, polypropylene (PP) wax, carnauba wax, paraffin wax, polyethylene acrylic acid wax, or mixtures thereof. Paraffin wax typically has a melting temperature of 46 to 71° C. In some embodiments, high density polyethylene (HDPE) wax is used. Suitable commercially available wax dispersions include, for example, MICHEM™ ME 62330 paraffin/PE wax emulsion, MICHEM ME 34935 paraffin/ethylene acrylic acid wax emulsion, MICHEM 180 paraffin/carnauba wax emulsion, and MICHEM ME 71450 paraffin wax emulsion all available from Michelman Inc.; ULTRALUBE E340 paraffin wax emulsion and ULTRALUBE E668H PP wax emulsion both available from Keim-Additec; or mixtures thereof. The wax dispersion may have, based on the total weight of the wax dispersion, a solids content of from 20 to 70% by weight, from 30 to 60% by weight, or from 40 to 50% by weight.

The concentration of the wax dispersion may be, by solids weight based on the total dry weight of the coating composition, 0.5% or more, 0.8% or more, or even 1% or more, and at the same time, 6% or less, 5% or less, 4% or less, or even 3% or less.

The aqueous coating composition of the present invention may further comprise one or more crosslinking agents. Examples of suitable crosslinking agents include adipic dihydrazide, sebacic dihydrazide, polyhydrazide, propylenediamine, cyclohexyldiamine, or mixtures thereof. When present, the concentration of the crosslinking agent may be, based on the total weight of the coating composition, 0.05% by weight or more, 0.2% by weight or more, or even 0.5% by weight or more, and at the same time, 5% by weight or less, 2% by weight or less, or even 1% by weight or less.

The aqueous coating composition of the present invention may further comprise one or more wetting agents. "Wetting agent" herein refers to a chemical additive that reduces the surface tension of a coating composition, causing the coating composition to more easily spread across or penetrate the surface of a substrate. Wetting agents may include polycarboxylates, anionic, zwitterionic, or non-ionic. Suitable commercially available wetting agents include, for example, SURFYNOL™ 104 nonionic wetting agent based on an actacetylenic diol available from Air Products, BYK™-346 and BYK-349 polyether-modified siloxanes both available from BYK, or mixtures thereof.

When present, the concentration of the wetting agent may be, based on the total weight of the coating composition, 0.1% by weight or more, 0.5% by weight or more, or even 1% by weight or more, and at the same time, 2.5% by weight or less, 2% by weight or less, or even 1% by weight or less.

The aqueous coating composition of the present invention may further comprise one or more defoamers. "Defoamer" herein refers to a chemical additive that reduces and hinders the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO™ Airex 902 W and TEGO Foamex 1488 polyether siloxane copolymer emulsions both available from Tego, BYK-024 silicone deformer available from BYK, or mixtures thereof. When present, the concentration of the defoamer may be, based on the total weight of the coating composition, generally from 0.01 to 1% by weight, from 0.05 to 0.8% by weight, or from 0.1 to 0.5% by weight.

The aqueous coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobic ally-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is based on HEUR, for example, ACRYSOL™ RM-8W thickener available from The Dow Chemical Company (ACRYSOL is a trademark of The Dow Chemical Company). When present, the concentration of the thickener is, based on the total weight of the coating composition, generally from 0.05 to 3% by weight, from 0.1 to 2% by weight, or from 0.3 to 1% by weight.

The aqueous coating composition of the present invention may further comprise water. The concentration of water may be, based on the total weight of the coating composition, from 30 to 90% by weight, from 40 to 80% by weight, or from 60 to 70% by weight.

In addition to the components described above, the aqueous coating composition of the present invention may further comprise any one or combination of the following additives: inorganic extenders, pigments, buffers, neutralizers, dispersants, humectants, mildewcides, biocides, anti-skinning agents, colorants, flowing agents, anti-oxidants, plasticizers, leveling agents, dispersants, thixotropic agents, adhesion promoters, and grind vehicles. When present, these additives may be in an amount of from 0.001 to 10% by weight, or from 0.01 to 2% by weight, based on the total weight of the aqueous coating composition.

The aqueous coating composition of the present invention may be prepared with techniques known in the coating art. The aqueous coating composition can be prepared by admixing the aqueous emulsion polymer, the colloidal silica, the alkyl silane described above, and water. Other optional components may also be added as described above. Components in the aqueous coating composition may be mixed in any order to provide the aqueous coating composition of the present invention. Any of the above-mentioned optional components may also be added to the composition during or prior to the mixing to form the aqueous coating composition.

The aqueous coating composition of the present invention has less than 150 grams of volatile organic components (VOC) per liter (g/L) of the coating composition according to the GB 18582 test method. Preferably, the VOC content of the aqueous coating composition is less than 140 g/L, or even less than 130 g/L. The aqueous coating composition of the present invention also has good storage stability, for example, the aqueous coating composition shows the change of Krebs units (KU) of 40 or less after storage at 50° C. for 10 days, according to the test method described in the Examples section below.

The process of using the aqueous coating composition of the present invention may comprise the following: applying the coating composition to a substrate, and drying the applied coating composition. The obtained coating film after drying the coating composition applied to the substrate has a pencil hardness of HB or harder according to ASTM D3363 method, a clarity value of at least 20%, and a water-resistance level of at least 3 and a 48% alcohol-resistance level of at least 3 according to BS: EN12720:2009 method. In a preferred embodiment, the coating film has a pencil hardness of H or harder, or even 2H or harder.

The aqueous coating composition of the present invention can be applied to a substrate by incumbent means including brushing, dipping, rolling and spraying. The aqueous coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. Drying the applied coating composition is generally conducted at room temperature, or even at 35 to 60° C.

The aqueous coating composition of the present invention can be applied to, and adhered to, various substrates. Examples of suitable substrates include wood, metals, plastics, foams, stones, elastomeric substrates, glass, fabrics, concrete, or cementious substrates. The aqueous coating composition is suitable for various coating applications, such as marine and protective coatings, automotive coatings, wood coatings, coil coatings, plastic coatings, powder coatings, can coatings, and civil engineering coatings. The aqueous coating composition is particularly suitable for wood coatings. The aqueous coating composition can be used alone, or in combination with other coatings to form multi-layer coatings.

EXAMPLES

Some embodiments of the invention will now be described in the following Examples, wherein all parts and percentages are by weight unless otherwise specified. The following materials are used in the examples:

2-ethylhexyl acrylate ("2-EHA"), methyl methacrylate ("MMA"), styrene ("ST"), hydroxyethyl acrylate ("HEMA"), methacrylic acid ("MAA"), ammonium persulfate (APS), and ammonium (25%) ($NH_4OH$) are all available from Sinoreagent Group.

Diacetone acrylamide ("DAAM") and adipic acid dihydrazide dihydrazide ("ADH") are both available from Kyowa Hakko Chemical Co., Ltd.

LATEMUL™ PD-104 is a reactive anionic surfactant with 20% solids available from Kao Chemicals.

DISPONIL™ AFX 4070 is a 70% active nonionic surfactant from BASF SE.

SILQUEST A-187 silane is a liquid 3-glycidoxypropyltrimethoxysilane available from Momentive Performance Materials Holdings LLC.

DYNASYLAN PTEO is propyltriethoxysilane available from Evonik Industries.

DYNASYLAN IBTEO is isobutyltriethoxysilane available from Evonik Industries

DYNASYLAN OCTEO is octyltriethoxysilane available from Evonik Industries

DYNASYLAN OCTMO is octyltrimethoxysilane available from Evonik Industries.

DYNASYLAN 9116 functional silane is hexadecyltrimethoxysilane available from Evonik Industries.

Dimethyldimethoxysilane, dimethyldiethoxysilane, and methyltrimethoxysilane are all available from Sinopharm Chemical Reagent Co., Ltd.

QP8-5314 is available from Dow Corning.

BINDZIL™ 2040 dispersion, available from Akzo Nobel, is basic colloidal silica having a pH value of 9-10 and 40% solids of 20 nm amorphous silica spheres.

DOWANOL DPnB glycol ether ("DPnB") is dipropylene glycol n-butyl ether used as a coalescent available from The Dow Chemical Company.

TEGO Airex 902 W defoamer is available from Tego.

BYK-346 wetting agent is available from BYK.

DEUTERON MK matting agent, available from Deuteron, is based on polyurea powder and has a D50 particle size of 6.3 microns.

ACRYSOL RM-8W rheology modifier ("RM-8W") is available from The Dow Chemical Company.

TEGO Glide 410 is available from Tego and is used as a glide and anti-crater additive.

The following standard analytical equipment and methods are used in the Examples.

Average Particle Size

The average particle size of colloidal silica is determined by the method of the analytical ultracentrifuge (AUC). AUC is carried out on SGS M-Scan's Beckman-Coulter XL-A Analytical Ultracentrifuge. Detailed procedure is described, for example, by K. L. Planken, Analytical Chemistry, 80 (23): 8871-8879, 2008.

Storage Stability of a Coating Composition

KU values of a coating composition are tested by a Brookfield viscosity meter according to ASTM D 562-2001 standard. The original viscosity is recorded as KU1. The coating composition is then put in an oven at 50° C. for 10 days. After balancing at room temperature for 24 hours, the viscosity is tested and recorded as KU2. If the difference of KU2 and KU1, ΔKU, is 40 or less, it indicates the coating composition has good storage stability. Otherwise, if ΔKU is more than 40, the storage stability of the coating composition is not acceptable.

Glass Transition Temperature

The value of $T_g$ herein is calculated according to the Fox Equation (T. G. Fox, Bull. Am. Phys. Soc. 1 (1956) 123).

Pencil Hardness

The pencil hardness of a coating film is measured according to the ASTM D3363 method. A coating composition is applied on a glass panel to form a 120 μm thick wet film and cured at room temperature for 7 days. The resultant film is then tested by a Zhonghua pencil. The hardness of the pencil used is: 9H, 8H, 7H, 6H, 5H, 4H, 3H, 2H, H, F, HB, B, 2B, 3B, 4B, 5B, 6B, where 9H is the hardest, 6B is the softest.

Clarity

A coating composition is coated on a glass plate to form a 120 microns thick wet film using a drawdown applicator, then is cured in an oven at 50° C. for 48 hours to form a panel. A BYK haze-gard dual haze meter is used to evaluate the clarity of the obtained coating film. Clarity is calculated using the following equation:

Clarity=Transmittance*(1−Haze)

The clarity of the glass plate before applying the coating composition is denoted as $C_{glass}$. The clarity of the panel is denoted as $C_{glass+film}$. The clarity of the coating film is measured according to the following equation:

Clarity of the coating film=$C_{glass+film}/C_{glass}\times 100\%$

A clarity value of at least 20% for the coating film is acceptable for wood coatings. The higher the clarity value, the better clarity.

Water Resistance and 48% Alcohol Resistance

The water resistance and 48% alcohol resistance properties of coating films are determined by the BS EN 12720: 2009 method.

Panels are prepared by brush applying three layers of coats at 80-90 grams per square meter (gram/m²) over wood. After the first coat, panels are left at room temperature for 4 hours, then sanded with sand paper. After the third coat, panels are dried at room temperature for 4 hours, then placed in an oven at 50° C. for 48 hours before the water resistance or alcohol resistance test.

For the water resistance test, disc type filter paper is first saturated with water. The paper is then placed on the above finished panels and covered with a cap to reduce evaporation. After 24 hours, the cap is removed. Tested areas are wiped with wet facial tissues, and dried at room temperature to observe the degree of damage. The degree of damage is defined as the following levels. The higher the rating level, the better the water resistance.

For the 48% alcohol resistance test, filter discs are saturated with 48% alcohol, then are placed on the above finished panels and covered with a cap to reduce evaporation. After 1 hour, the cap is removed. Tested areas are wiped with wet facial tissues, and dried at room temperature to observe the damage degree. The degree of damage is defined as the following levels. The higher the rating level, the better the 48% alcohol resistance.

5—No change: Test area indistinguishable from adjacent surrounding area.

4—Minor change: Test area distinguishable from adjacent surrounding area, only when the light source is mirrored on the test surface and is reflected towards the observer's eye, for example, discoloration; change in gloss and color; and/or no change in the surface structure such as swelling, fiber raising, cracking and/or blistering.

3—Moderate change: Test area distinguishable from adjacent surrounding area, visible in several viewing directions, for example, discoloration; change in gloss and color; and/or no change in the surface structure such as swelling, fiber raising, cracking and/or blistering.

2—Significant change: Test area clearly distinguishable from adjacent surrounding area, visible in all viewing directions, for example, discoloration; change in gloss and color; and/or slightly change in the surface structure such as swelling, fiber raising, cracking and/or blistering.

1—Strong change: The structure of the surface being distinctly changed and/or discoloration, change in gloss and color, and/or the surface material being totally or partially removed, and/or the filter paper adhering to the surface.

Preparation of Acrylic Copolymer Emulsions

Emulsion 1

Preparation of Monomer Emulsion 1: LATEMUL PD-104 surfactant (52.3 grams (g), 20% by weight of solids) was dissolved in deionized water (186 g) with stirring. Then 2-EHA (336.5 g), MMA (148 g), styrene (148 g) and MAA (13.3 g) were slowly added into the resulting surfactant solution to obtain Monomer Emulsion 1.

Preparation of Monomer Emulsion 2: LATEMUL PD-104 surfactant (26.2 g, 20 wt % solids) was dissolved in deionized water (189.8 g) with stirring. Then 2-EHA (164.3 g), MMA (229 g), DAAM (19.7 g), and MAA (13.1 g) were added into the resultant surfactant solution to obtain Monomer Emulsion 2.

A solution containing LATEMUL PD-104 surfactant (32.7 g, 20% by weight of solids) and deionized water (798 g) was added into a 4-neck, 5 liter round bottom flask equipped with a thermocouple, a cooling condenser and an agitator, and was heated to 85° C. under nitrogen atmosphere. An aqueous sodium carbonate solution (2.0 g sodium carbonate in 56 g deionized water), an aqueous ammonia persulfate (APS) initiator solution (2.0 g APS in 22 g deionized water), and 4.7% by weight of Monomer Emulsion 1 obtained above were then added into the flask. Within about 5 minutes, initiation of polymerization was confirmed by a temperature increase by 6° C. and a change of the external appearance of the reaction mixture. After heat generation stopped, the remaining Monomer Emulsion 1 was added gradually to the flask over a period of 90 minutes with stirring, and the temperature was maintained at 79-81° C. Monomer Emulsion 2 obtained above was then added into the flask in the same manner as Monomer Emulsion 1 over 90 minutes. Upon completing addition, the reaction mixture was held at 70° C. for 60 minutes, then cooled down to 50° C. and neutralized to a pH value of 7.0-8.0 by a 30% aqueous ammonia solution. The obtained mixture was held at 45-50° C. for 10 minutes. Then ADH slurry (7.9 g in 12 g water) was added into the flask over 10 minutes. The resultant mixture was cooled down to room temperature to obtain the acrylic copolymer emulsion. The obtained acrylic copolymer Emulsion 1 had the following properties: pH value 7.5, solids content 42.36% by weight, Brookfield viscosity 265 centipoises (cps), average particle size 91 nanometers (nm), and average $T_g$ 28° C.

Emulsion 2

Preparation of Monomer Emulsion 1: LATEMUL PD-104 surfactant (15.8 g, 20% by weight of solids) was dissolved in deionized water (114 g) with stirring. Then 2-EHA (76 g), MMA (155 g), styrene (155 g) and MAA (8 g) were slowly added into the resulting surfactant solution to obtain Monomer Emulsion 1.

Preparation of Monomer Emulsion 2: LATEMUL PD-104 surfactant (63 g, 20% by weight of solids) was dissolved in deionized water (261 g) with stirring. Then 2-EHA (424 g), MMA (216 g), DAAM (33 g), and MAA (18.3 g) were added into the resultant surfactant solution to obtain Monomer Emulsion 2.

A solution containing LATEMUL PD-104 surfactant (33 g, 20% by weight of solids) and deionized water (798 g) was added into a 4-neck, 5 liter round bottom flask equipped with a thermocouple, a cooling condenser and an agitator, and was heated to 85° C. under nitrogen atmosphere.

An aqueous sodium carbonate solution (2.0 g sodium carbonate in 56 g deionized water), an aqueous APS initiator solution (2.0 g APS in 22 g deionized water), and 7.8% by weight of Monomer Emulsion 1 obtained above were then added into the flask. Within about 5 minutes, initiation of polymerization was confirmed by a temperature increase by 6° C. and a change of the external appearance of the reaction mixture. After heat generation stopped, the remaining Monomer Emulsion 1 was added gradually to the flask over a period of 90 minutes with stirring, and the temperature was maintained at 79-81° C. Monomer Emulsion 2 obtained above was then added into the flask in the same manner as Monomer Emulsion 1 over 90 minutes. Upon completing addition, the reaction mixture was held at 70° C. for 60 minutes, then cooled down to 50° C. and neutralized to a pH value of 7.0-8.0 by a 30% aqueous ammonia solution. The obtained mixture was held at 45-50° C. for 10 minutes. Then ADH slurry (26 g in 48 g water) was added into the flask over 10 minutes. The resultant mixture was cooled down to room temperature to obtain the acrylic copolymer emulsion. The obtained acrylic copolymer Emulsion 2 had the following properties: pH value 7.58, solids content 42.15% by weight, Brookfield viscosity 235 cps, average particle size 103 nm, and average $T_g$ 28° C.

Emulsion 3 Synthesized in the Presence of OCTEO

Preparation of Monomer Emulsion 1: LATEMUL PD-104 surfactant (9.5 g, 20% by weight of solids) was dissolved in deionized water (68.7 g) with stirring. Then 2-EHA (45.8 g), MMA (93.1 g), styrene (93.1 g), MAA (4.8 g) and DYNA-SYLAN OCTEO (20.5 g) were slowly added into the resulting surfactant solution to obtain Monomer Emulsion 1.

Preparation of Monomer Emulsion 2: LATEMUL PD-104 surfactant (37.6 g, 20% by weight of solids) was dissolved in deionized water (157 g) with stirring. Then 2-EHA (255 g), MMA (129 g), DAAM (19.7 g), MAA (11.1 g) and DYNASYLAN OCTEO (48 g) were added into the resultant surfactant solution to obtain Monomer Emulsion 2.

A solution containing LATEMUL PD-104 surfactant (19.6 g, 20% by weight of solids) and deionized water (600 g) was added into a 4-neck, 5 liter round bottom flask equipped with a thermocouple, a cooling condenser and an agitator, and was heated to 85° C. under nitrogen atmosphere. An aqueous sodium carbonate solution (1.2 g sodium carbonate in 34 g deionized water), an aqueous APS initiator solution (1.2 g APS in 14 g deionized water), and 7.8% by weight of Monomer Emulsion 1 obtained above were then added into the flask. Within about 5 minutes, initiation of polymerization was confirmed by a temperature increase by 6° C. and a change of the external appearance of the reaction mixture. After heat generation stopped, the remaining Monomer Emulsion 1 was added gradually to the flask over a period of 90 minutes with stirring, and the temperature was maintained at 79-81° C. Monomer Emulsion 2 obtained above was then added into the flask in the same manner as Monomer Emulsion 1 over 90 minutes. Upon completing addition, the reaction mixture was held at 70° C. for 60 minutes, then cooled down to 50° C. With agitation add BINDIL 2040 (1368 g) over 45 mins. The obtained mixture was held at 45-50° C. for 10 minutes. Then ADH slurry (15.7 g in 28.8 g water) was added into the flask over 10 minutes. The resultant mixture was cooled down to room temperature to obtain the acrylic copolymer emulsion. The obtained acrylic copolymer Emulsion 3 had the following properties: pH value 8.81, solids content 40.64% by weight, Brookfield viscosity 17 cps, average particle size 99 nm, and average $T_g$ 28° C.

Emulsion 4

Preparation of Monomer Emulsion 1: LATEMUL PD-104 surfactant (15.8 g, 20% by weight of solids) was dissolved in deionized water (114 g) with stirring. Then 2-EHA (16 g), MMA (185 g), styrene (185 g) and MAA (8 g) were slowly added into the resulting surfactant solution to obtain Monomer Emulsion 1.

Preparation of Monomer Emulsion 2: LATEMUL PD-104 surfactant (63 g, 20% by weight of solids) was dissolved in deionized water (261 g) with stirring. Then 2-EHA (424 g), MMA (216 g), DAAM (33 g), and MAA (18.3 g) were added into the resultant surfactant solution to obtain Monomer Emulsion 2.

The emulsion 4 was then prepared according to the same procedure described above in preparing Emulsion 2. The obtained acrylic copolymer Emulsion 4 had the following properties: pH value 7.75, solids content 43.01% by weight, Brookfield viscosity 21 cps, average particle size 97 nm, and average $T_g$ 35° C.

Emulsion 5

Preparation of Monomer Emulsion 1: LATEMUL PD-104 surfactant (15.8 g, 20% by weight of solids) was dissolved in deionized water (114 g) with stirring. Then 2-EHA (76 g), MMA (310 g), and MAA (8 g) were slowly added into the resulting surfactant solution to obtain Monomer Emulsion 1.

Preparation of Monomer Emulsion 2: LATEMUL PD-104 surfactant (63 g, 20 wt % solids) was dissolved in deionized water (261 g) with stirring. Then 2-EHA (424 g), MMA (431 g), DAAM (33 g), and MAA (18.3 g) were added into the resultant surfactant solution to obtain Monomer Emulsion 2.

The emulsion 5 was then prepared according to the same procedure as described in preparing Emulsion 2. The obtained acrylic copolymer Emulsion 5 had the following properties: pH value 8.19, solids content 43.7% by weight, Brookfield viscosity 49 cps, average particle size 113 nm, and average $T_g$ 28° C.

Emulsion 6

Preparation of Monomer Emulsion 1: LATEMUL PD-104 surfactant (15.8 g, 20% by weight of solids) was dissolved in deionized water (114 g) with stirring. Then 2-EHA (76 g), MMA (155 g), styrene (155 g) and MAA (8 g) were slowly added into the resulting surfactant solution to obtain Monomer Emulsion 1.

Preparation of Monomer Emulsion 2: LATEMUL PD-104 surfactant (63 g, 20% by weight of solids) was dissolved in deionized water (261 g) with stirring. Then 2-EHA (424 g), MMA (229 g), DAAM (19.7 g), and MAA (18.3 g) were added into the resultant surfactant solution to obtain Monomer Emulsion 2.

The Emulsion 6 was then prepared according to the same procedure as described in preparing the Emulsion 2, except that ADH slurry (7.9 g in 19.7 g water) was used. The obtained acrylic copolymer Emulsion 6 had the following properties: pH value 8.13, solids content 43.64% by weight, Brookfield viscosity 356 cps, average particle size 96 nm, and average $T_g$ 28° C.

Preparation of Alkyl Silane Emulsions 100 g of DYNASYLAN PETO, IBTEO, OCTEO, OCTMO, or 9116 alkyl silane, respectively, were added into 143 g of water and 7.2 g of DISPONIL AFX 4070 surfactant (70% active). The mixture was agitated over 10 minutes at 400 revolutions per minute (rpm). Then the dispersion was agitated using high shear homogenizer at 10,000 rpm for 1-2 minutes to get viscous dispersion. The obtained alkyl silane emulsion had an active component of 40% by weight and was used in the following coating compositions.

Examples (Exs) 1-9

Coating compositions of Exs 1-9 were prepared based on formulations shown in Table 1. The ingredients listed in Table 1 (let down) were mixed using a conventional lab mixer.

Comp Ex I

The coating composition of Comp Ex I was substantially the same as CN102399483A. The coating composition of Comp Ex I was prepared based on formulations described in Table 3. All components were mixed one by one from top to bottom. The resultant coating composition was balanced at room temperature overnight. The coating composition was then coated on a vinyl chart substrate and cured at room temperature for 7 days to evaluate water resistance property according to the GB/T 1733-1993 method. The resultant coating film did not show visible appearance change after 96 hours as described in CN102399483A.

TABLE 1

| | Coating composition, gram | | | | | | | | |
|---|---|---|---|---|---|---|---|---|---|
| | Ex 1 | Ex 2 | Ex 3 | Ex 4 | Ex 5 | Ex 6 | Ex 7 | Ex 8 | Ex 9 |
| Acrylic emulsion | Emulsion 1 57.80 | Emulsion 2 54.4 | Emulsion 2 40.8 | Emulsion 2 47.6 | Emulsion 2 47.6 | Emulsion 2 47.6 | Emulsion 4 40.8 | Emulsion 5 40.8 | Emulsion 6 40.8 |
| BINDZIL 2040 colloidal silica | 10.20 | 13.6 | 27.2 | 20.4 | 20.4 | 20.4 | 27.2 | 27.2 | 27.2 |
| Alkyl silane emulsion | OCTEO emulsion 1.00 | OCTEO emulsion 2.72 | OCTEO emulsion 3.4 | OCTMO emulsion 3.4 | OCTEO emulsion 3.4 | 9116 emulsion 3.4 | OCTEO emulsion 5 | OCTEO emulsion 5 | OCTEO emulsion 5 |
| PNB | 2.50 | 2.50 | 2.50 | 2.50 | 2.50 | 2.50 | 2.50 | 2.50 | 2.50 |
| DPnB | 1.00 | 1.00 | 1.00 | 1.00 | 1.00 | 1.00 | 1.00 | 1.00 | 1.00 |
| TEGO Airex 902w | 0.30 | 0.30 | 0.30 | 0.30 | 0.30 | 0.30 | 0.30 | 0.30 | 0.30 |
| BYK-346 | 0.30 | 0.30 | 0.30 | 0.30 | 0.30 | 0.30 | 0.30 | 0.30 | 0.30 |
| DEUTERON MK | 3.00 | 3.00 | 3.00 | 3.00 | 3.00 | 3.00 | 3.00 | 3.00 | 3.00 |
| Water | 23.40 | 21.68 | 21.00 | 21.00 | 21.00 | 21.00 | 19.40 | 19.40 | 19.40 |
| Glide410 | 0.30 | 0.30 | 0.30 | 0.30 | 0.30 | 0.30 | 0.30 | 0.30 | 0.30 |
| ACRYSOL RM-8W | 0.20 | 0.20 | 0.20 | 0.20 | 0.20 | 0.20 | 0.20 | 0.20 | 0.20 |
| ΔKU | 3 | 2 | 5 | 3 | 2 | 7 | 3 | 4 | 1 |
| VOC, g/L | 106 | 106 | 106 | 106 | 106 | 106 | 106 | 106 | 106 |

Comparative (Comp) Exs A-H

Coating compositions of Comp Exs A-H were prepared based on formulations shown in Table 2. The ingredients listed in Table 2 (let down) were mixed using a conventional lab mixer.

TABLE 3

| Coating composition of Comp Ex I | Dosage (gram) |
|---|---|
| Emulsion 2 | 12 |
| BINDZIL 2040 colloidal silica | 18 |

TABLE 2

| | Comp Coating Composition, gram | | | | | | | |
|---|---|---|---|---|---|---|---|---|
| | Comp Ex A | Comp Ex B | Comp Ex C | Comp Ex D | Comp Ex E | Comp Ex F | Comp Ex G | Comp Ex H |
| Acrylic emulsion | Emulsion 2 40.8 | Emulsion 2 34 | Emulsion 2 47.6 | Emulsion 2 47.6 | Emulsion 2 47.6 | Emulsion 2 47.6 | Emulsion 3 40.8 | Emulsion 1 61.2 |
| BINDZIL 2040 colloidal silica | 27.2 | 34 | 20.4 | 20.4 | 20.4 | 20.4 | 27.2 | 6.8 |
| Alkyl silane emulsion | OCTEO emulsion 1.67 | OCTEO emulsion 3.4 | A-187 silane 2 | OCTEO emulsion 5 | PETO emulsion 3.4 | IBTEO emulsion 3.4 | — | OCTEO emulsion 1 |
| PNB | 2.50 | 2.50 | 2.50 | 2.50 | 2.50 | 2.50 | 2.50 | 2.50 |
| DPnB | 1.00 | 1.00 | 1.00 | 1.00 | 1.00 | 1.00 | 1.00 | 1.00 |
| TEGO Airex 902w | 0.30 | 0.30 | 0.30 | 0.30 | 0.30 | 0.30 | 0.30 | 0.30 |
| BYK-346 | 0.30 | 0.30 | 0.30 | 0.30 | 0.30 | 0.30 | 0.30 | 0.30 |
| DEUTERON MK | 3.00 | 3.00 | 3.00 | 3.00 | 3.00 | 3.00 | 3.00 | 3.00 |
| Water | 22.73 | 21.00 | 22.40 | 19.40 | 21.00 | 21.00 | 21.00 | 23.40 |
| Glide410 | 0.30 | 0.30 | 0.30 | 0.30 | 0.30 | 0.30 | 0.30 | 0.30 |
| ACRYSOL RM-8W | 0.20 | 0.20 | 0.20 | 0.20 | 0.20 | 0.20 | 0.20 | 0.20 |
| ΔKU | 5 | 2 | 7 | 9 | 30 | 24 | 6 | 3 |
| VOC, g/L | 106 | 106 | 106 | 106 | 106 | 106 | 106 | 106 |

TABLE 3-continued

| Coating composition of Comp Ex I | Dosage (gram) |
| --- | --- |
| Ceramic powder available from Sinopharm Chemical Reagent Co., Ltd. | 10 |
| TI-PURE ™ R-706 titanium dioxide available from DuPont | 20 |
| Glass beads available from Sinopharm Chemical Reagent Co., Ltd. | 3 |
| French chalk available from Sinopharm Chemical Reagent Co., Ltd. | 10 |
| BYK-346 wetting agent | 0.2 |
| TAMOL ™ 731A dispersant available from The Dow Chemical Company (TAMOL is a trademark of The Dow Chemical Company) | 0.5 |
| OCTEO emulsion | 0.4 |
| ACRYSOL RM-8W thickener | 0.2 |
| TEGO Airex 902 W defoamer | 0.2 |
| DOWANOL DPnB coalescent | 3 |
| Water | 22.5 |

Comp Ex J 20 mL tetraethyl orthosilicate ("TEOS"), 84 mL ethanol and 4 mL hydrochloric acid (HCl) solution (0.01 mol/L) were mixed in a 200 mL glass vessel. The resultant mixture was agitated at room temperature for about 24 hours. Then 4.4 mL DYNASYLAN OCTEO was added into the mixture and agitated for about 30 minutes. The obtained mixture was then added into 31.63 g of Emulsion 2 prepared above. The resultant dispersion gelled only after 1-day storage at room temperature.

Comp Exs K-N

Coating compositions of Comp Exs K-N were prepared according to similar formulation as the coating composition of Ex 8, except that different emulsion and alkyl silanes were used based on formulations described in Table 4. As shown in Table 4, the coating compositions of Comp Exs K-N gelled after 10-day storage at 50° C.

TABLE 4

| | Binder emulsion | Alkyl silane | Storage stability of coating composition |
| --- | --- | --- | --- |
| Comp Ex K | Emulsion 2 | Dimethyldimethoxysilane | Gelled |
| Comp Ex L | Emulsion 2 | Dimethyldiethoxysilane | Gelled |
| Comp Ex M | Emulsion 2 | QP8-5314 | Gelled |
| Comp Ex N | Emulsion 2 | Methyltrimethoxysilane | Gelled |

As shown in Tables 1 and 2, coating compositions of Exs 1-9 and Comp Exs A-H showed good storage stability. Properties of coating films made from these compositions were evaluated according to the test methods described above and were reported in Table 5.

The coating composition of Comp Ex A comprised a low level of the alkyl silane (weight ratio of alkyl silane/silica=0.613). The coating composition of Comp Ex B comprised a low level of the alkyl silane (weight ratio of alkyl silane/silica=0.10) and a high level of the colloid silica (weight ratio of silica/acrylic copolymer=1). The resultant coating films of Comp Ex A, B, respectively, showed unacceptable low water resistance and alcohol resistance.

The coating composition of Comp Ex C comprised an epoxy silane (weight ratio of epoxy silane/silica=0.167). The resultant coating film shows unacceptable low clarity, water resistance and alcohol resistance.

The coating composition of Comp Ex D comprised too much alkyl silane (weight ratio of OCTEO/silica=0.25). The coating composition of Comp Ex E comprised PETO, the alkyl group of which only has 3 carbon atoms (weight ratio of PETO/silica=0.167). The coating composition of Comp Ex F comprised IBTEO, the alkyl group of which only has 4 carbon atoms (weight ratio of IBTEO/silica=0.167). The clarity of the resultant coating films of Comp Exs D-F was too low to be acceptable.

When OCTEO was introduced during synthesizing the acrylic binder Emulsion 3 instead of post-added into a coating composition, the coating composition of Comp Ex G comprised such binder emulsion (weight ratio of OCTEO in the Emulsion 3/silica=0.125) provided the resultant coating film with a pencil hardness of B, which is not acceptable.

The coating composition of Comp Ex H comprised a low level of the colloid silica (weight ratio of silica/acrylic copolymer=0.11). The resultant coating film was too soft, which only showed a pencil hardness lower than HB.

TABLE 5

| | Properties of coating film | | | |
| --- | --- | --- | --- | --- |
| | Water Resistance | 48% Alcohol Resistance | Pencil Hardness | Clarity, % |
| Ex 1 | 3 | 4 | HB | 33.0 |
| Ex 2 | 4 | 4 | H | 23.7 |
| Ex 3 | 3 | 4 | 2H | 24.7 |
| Ex 4 | 4 | 4 | 2H | 22.4 |
| Ex 5 | 4 | 4 | 2H | 24.3 |
| Ex 6 | 4 | 4 | 2H | 25.8 |
| Ex 7 | 4 | 4 | H | 40 |
| Ex 8 | 4 | 4 | H | 30.2 |
| Ex 9 | 4 | 4 | H | 30 |
| Comp Ex A | 2 | 2 | 2H | 21.3 |
| Comp Ex B | 2 | 2 | 2H | 7.7 |
| Comp Ex C | 2 | 2 | F | 9.8 |
| Comp Ex D | 4 | 3 | H | 17.5 |
| Comp Ex E | 4 | 3 | 2H | 9.8 |
| Comp Ex F | 4 | 3 | 2H | 10.5 |
| Comp Ex G | 4 | 3 | B | 27.5 |
| Comp Ex H | 4 | 4 | B | 40 |
| Comp Ex I | 1 | — | 2B | — |

What is claimed is:

1. An aqueous coating composition, comprising,
(a) an aqueous emulsion polymer present in an amount of from 50 to 88% by weight based on total solids weight of the coating composition;
(b) colloidal silica present in an amount of from 14 to 80%, by solids weight, based on the weight of the emulsion polymer;
(c) an alkyl silane of Formula (I):

Formula (I)

wherein $R_1$ is a saturated alkyl group with more than 4 carbon atoms; $R_2$ is an alkoxy group with 1 to 3 carbon atoms, and n is an integer from 1 to 3; wherein the weight ratio of the alkyl silane to solids weight of the colloidal silica is from 0.11 to 0.23; and (d) water; wherein the content of volatile organic components in the coating composition is less than 150 g/L.

2. The aqueous coating composition of claim 1, wherein $R_1$ is a saturated alkyl group with 8 to 16 carbon atoms.

3. The aqueous coating composition of claim 1, wherein the alkyl silane is selected from the group consisting of octyl triethoxylsilane, octyl trimethoxylsilane, hexadecyl trimethoxy silane, hexadecyl triethoxyl silane, and mixtures thereof.

4. The aqueous coating composition of claim 1, wherein the weight ratio of the alkyl silane to solids weight of the colloidal silica is from 0.125 to 0.2.

5. The aqueous coating composition of claim 1, wherein the colloidal silica is present in an amount of from 17 to 66%, by solids weight, based on the weight of the emulsion polymer.

6. The aqueous coating composition of claim 1, wherein the colloidal silica has an average particle size of no more than 100 nm.

7. The aqueous coating composition of claim 1, wherein the emulsion polymer has a glass transition temperature of from 0 to 45° C.

8. The aqueous coating composition of claim 1, wherein the emulsion polymer is an acrylic emulsion copolymer.

9. The aqueous coating composition of claim 8, wherein the acrylic emulsion copolymer comprises, as copolymerized units, at least one ethylenically unsaturated monomer having a functional group selected from the group consisting of carbonyl, acetoacetate, alkoxysilane, carboxyl, ureido, amide, imide, amino group, and mixtures thereof.

10. The aqueous coating composition of claim 1, further comprising one or more selected from the group consisting of a coalescent, a solvent, a wetting agent, a defoamer, a thickener, a rheology modifier, a matting agent, a dispersant, a wax dispersion, and mixtures thereof.

11. The aqueous coating composition of claim 1, having a pigment volume concentration of from 0 to 20%.

12. An aqueous coating composition comprising,
 (a) from 60 to 86.4% by weight, based on total solids weight of the coating composition, an acrylic emulsion copolymer comprising, as copolymerized units, at least one ethylenically unsaturated nonionic monomer and at least one ethylenically unsaturated monomer having a functional group selected from the group consisting of carbonyl, acetoacetate, alkoxysilane, carboxyl, ureido, amide, imide, amino group, and mixtures thereof;
 (b) from 17 to 42% by solids weight of colloidal silica, based on the weight of the emulsion polymer;
 (c) an alkyl silane of Formula (I):

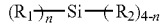

$$(R_1)_{\overline{n}}-Si-(R_2)_{4-n} \qquad \text{Formula (I)}$$

wherein $R_1$ is a saturated alkyl group with 6 to 16 carbon atoms; $R_2$ is an alkoxy group with 1 to 3 carbon atoms, and n is an integer from 1 to 3; wherein the weight ratio of the alkyl silane to solids weight of the colloidal silica is from 0.15 to 0.2;
 (d) water;
 (e) from 0.5 to 4.5% by weight of a coalescent, based on total solids weight of the coating composition;
 (f) from 0 to 4% by weight of a matting agent, based on total solids weight of the coating composition; and
 (g) from 0 to 1% by weight of a crosslinking agent, based on total solids weight of the coating composition;
 wherein the content of volatile organic components in the coating composition is less than 150 g/L.

13. A process of preparing the aqueous coating composition of of claim 1, comprising: admixing
 (a) an aqueous emulsion polymer present in an amount of from 50 to 88% by weight based on total solids weight of the coating composition;
 (b) colloidal silica present in an amount of from 14 to 80%, by solids weight, based on the weight of the emulsion polymer;
 (c) an alkyl silane of Formula (I):

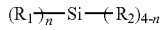

$$(R_1)_{\overline{n}}-Si-(R_2)_{4-n} \qquad \text{Formula (I)}$$

wherein $R_1$ is a saturated alkyl group with more than 4 carbon atoms; $R_2$ is an alkoxy group with 1 to 3 carbon atoms, and n is an integer from 1 to 3; wherein the weight ratio of the alkyl silane to solids weight of the colloidal silica is from 0.11 to 0.23; and
 (d) water;
 wherein the content of volatile organic components in the coating composition is less than 150 g/L.

14. The aqueous coating composition of claim 1, wherein the colloidal silica is non-neutral.

* * * * *